United States Patent [19]

Bell, Jr. et al.

[11] 4,306,135
[45] Dec. 15, 1981

[54] POWER OUTPUT MODULE FOR ELECTRICAL DISCHARGE MACHINING POWER SUPPLY CIRCUIT

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 42,024

[22] Filed: May 24, 1979

[51] Int. Cl.³ .............................................. B23P 1/02
[52] U.S. Cl. .................................. 219/69 C; 219/69 P
[58] Field of Search ................ 219/69 P, 69 C, 69 S, 219/69 M; 307/264

[56] References Cited

U.S. PATENT DOCUMENTS

| | | | |
|---|---|---|---|
| 3,492,530 | 1/1970 | Ullmann et al. | 219/69 C |
| 3,879,596 | 4/1975 | Verner | 219/69 P |
| 3,974,357 | 8/1976 | Saito et al. | 219/69 C |

OTHER PUBLICATIONS

Miuman & Halkias, *Integrated Electronics: Analog & Digital Circuits & Systems*, 1972, pp. 339-341.

*Primary Examiner*—C. C. Shaw
*Attorney, Agent, or Firm*—Harry R. Dumont

[57] ABSTRACT

Included in the power supply is an output module connected to the gap which module uses a power FET. This module has its current output and the current to the gap controlled as a linear function of the control voltage applied to the gate of the FET. A suitable input means for the control voltage, includes manually controlled potentiometers, microprocessors, keyboards and the like.

7 Claims, 4 Drawing Figures

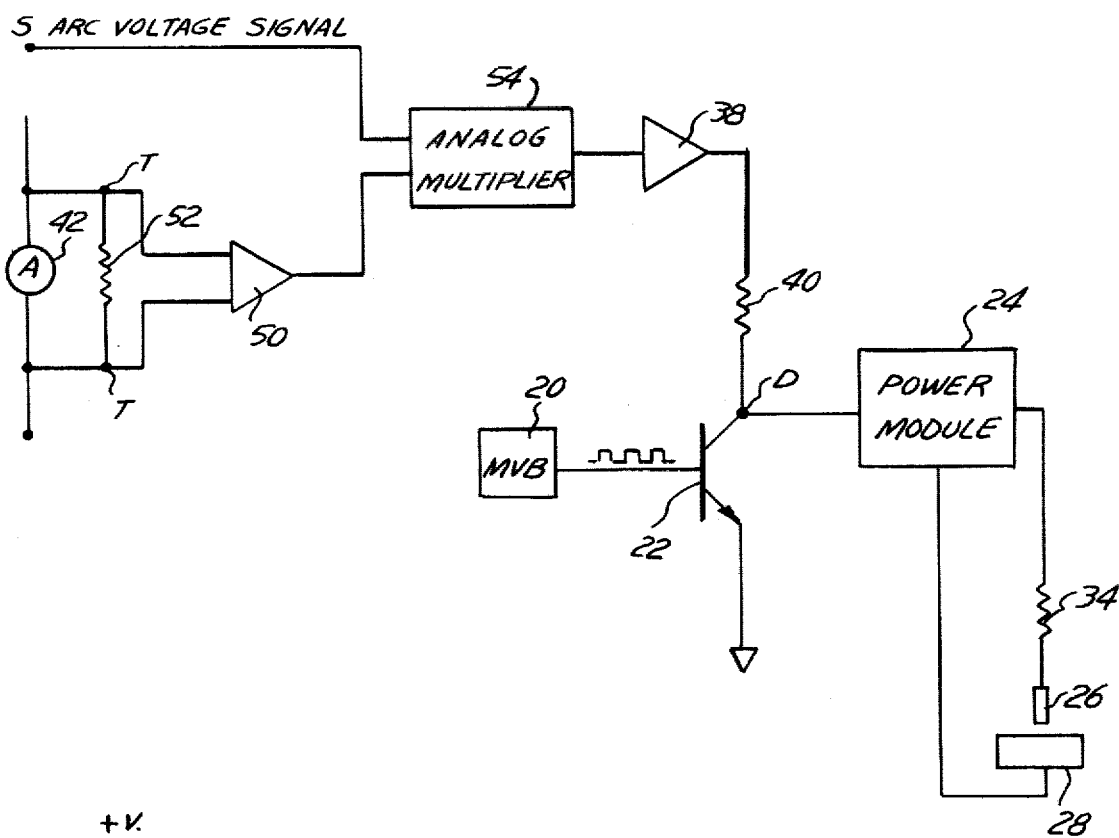
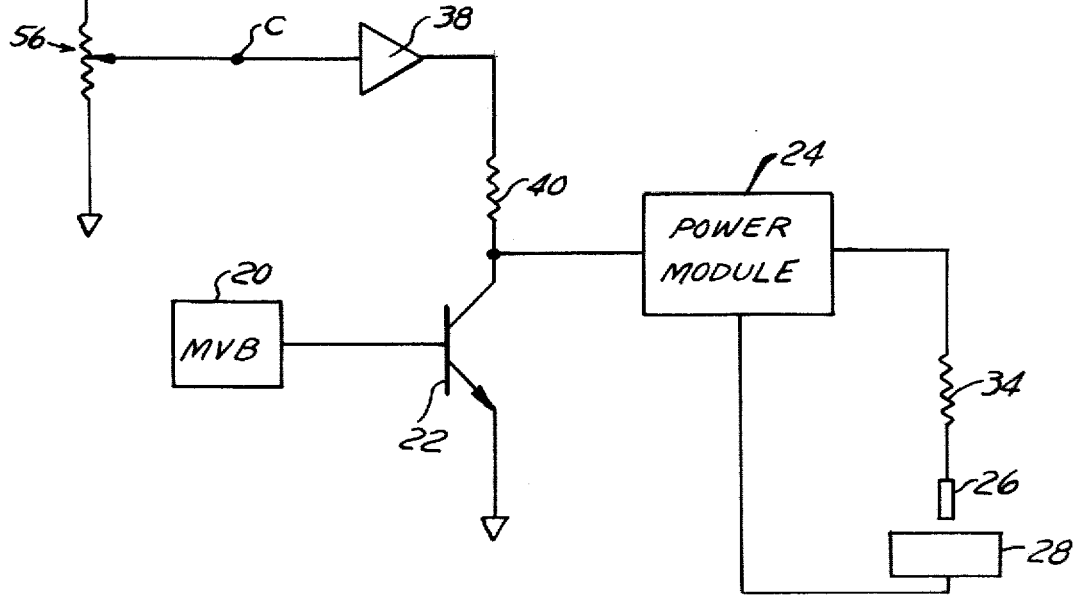

POWER OUTPUT MODULE FOR ELECTRICAL DISCHARGE MACHINING POWER SUPPLY CIRCUIT

FIELD OF THE INVENTION

The present invention relates to an improved power supply circuit for electrical discharge machining. It makes possible linear control over a broad range of the machining current being furnished to the gap.

BACKGROUND OF THE INVENTION

Electrical discharge machining circuitry has advanced from the early stages in which relaxation oscillators were used to provide machining power pulses. Independently timed and controlled pulse generators are now almost universally used and in those generators electronic switches are employed in the form of solid state switches or banks of parallel connected switches, particularly transistors. These switches are used to provide the machining power pulses to the gap.

In the electrical discharge machining process, sometimes hereinafter referred to as "EDM", it is necessary that as the workpiece material is removed, a predetermined gap be maintained between the tool electrode and the workpiece through a servo feed system which provides a continuous advance into and toward the workpiece as the material removal progresses. During the electrical discharge machining process, a fluid coolant is circulated through the machining gap to flush the removed workpiece particles from the gap. The coolant is usually furnished under pressure by a pump through one or more openings provided in the electrode and/or workpiece.

One defining characteristic of electrical discharge machining is that the coolant is a dielectric fluid such as kerosene, transformer oil, distilled water, or the like. The dielectric fluid is broken down in minute, localized areas by the action of the machining power pulses, passed between the closely opposed surfaces of the tool electrode and the workpiece. For control of the servo feed system, there is generally utilized an electrical signal from the machining gap in order to control the rate and the direction of servo feed. In many cases, this gap signal is compared to an adjustable reference voltage so that the machine operator can select the rate of servo feed desired.

In precision EDM, it is necessary to precisely control current output from the power module connected to the gap. This control has been generally maintained in the prior art by switching one or more power limiting resistors into or out of circuit with the machining gap. This necessarily results in a non-linear type of current control. Additional problems arise from the relays involved in switching the resistors in series with the gap. The present invention, for the first time, makes possible a linear gap current control in a novel and simplified manner.

It will be understood in the specification that when we refer to "electronic switch", we mean any electronic control device having several electrodes comprising at least two principal or power conducting electrodes acting to control current flow in the power circuit, the conductivity between the principal electrodes generally being controlled by a control electrode in the switch whereby the conductivity of the power circuit is controlled statically or electrically without movement of mechanical elements within the switch. Included within the definition are transistors in which turn-on is accomplished by a control voltage applied to the transistor control electrode and in which turn-off is accomplished automatically in response to the removal of that control voltage. Also included in the definition are devices of the gate type in which turn-on is accomplished by a control voltage applied to the control electrode, which control voltage may be then removed and in which turn-off is accomplished by application of a subsequent control voltage to the control electrode. An additional class of electronic switches, called "electronic trigger devices", falls within this definition and includes thyratrons, semi-conductor controlled rectifiers, and the like. By electronic trigger device, we mean any electronic switch of the type which is triggered on at its control electrode by a pulse and is turned off by a reverse voltage applied for a sufficient time across its principal electrode.

The present invention further incorporates a particular type of electronic switch known in the art as a power field effect transistor. One such type of transistor, specifically a VMOS power field effect transistor sometimes hereinafter referred to as a power FET is included in the circuits used for out invention. Power FET's appropriate for inclusion in EDM power modules are currently manufactured and sold by Siliconix Incorporated, 401 Broad Hollow Rd., Mellville, N.Y. 11746.

SUMMARY OF THE INVENTION

The present invention provides an improved output module capable of providing its output current to the EDM gap. The output current is controlled in a linear manner in accordance with an externally applied control voltage. The control voltage is connected to the gate of a power FET that is incorporated as the electronic switching element in the output module. The control voltage may be derived from a peripheral input means such as a keyboard or a microprocessor which contains a binary representation of the desired magnitude of current. The voltage is then passed through a digital to analog converter and then used to control the height of the voltage pulses being supplied to the power FET.

It is also possible to provide the control voltage from a potentiometer that may be manually adjusted by the machine operator.

BRIEF DESCRIPTION OF THE DRAWINGS

In the drawings wherein like reference numerals have been used to designate like parts herein referred to throughout the several views:

FIG. 3 is a combined block diagramatic and schematic showing of a different form of the invention; and FIG. 4 is a combined schematic and block diagrammatic showing of a still further embodiment of our invention.

DETAILED DESCRIPTION OF THE INVENTION

Figures 1, 2:
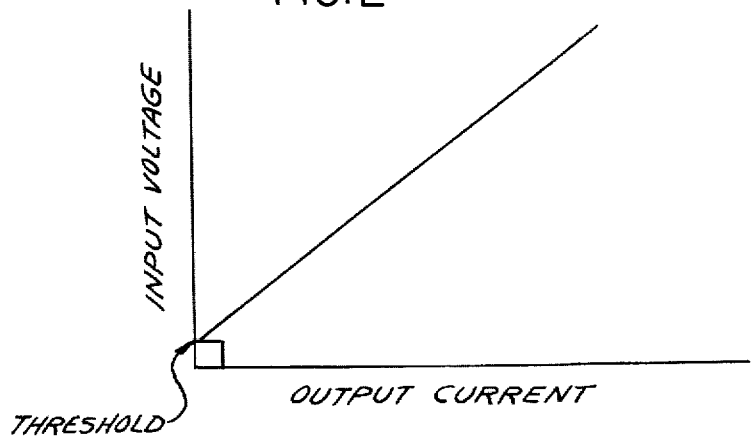
FIG. 1 is a combined schematic and block diagramatic showing of a basic EDM power supply circuit.
FIG. 2 is a plot of input voltage against output current illustrating the operation of the invention.

FIG. 1 shows the basic parts of an electrical discharge machining power supply circuit. Included in the system is a multivibrator 20 and a drive transistor 22. Triggering pulses are passed from the multivibrator 20 to the base of the drive transistor 22. A power module 24 is used to provide machining power pulses to an EDM gap including an electrode 26 and a workpiece 28. Included in the power module 24 is an electronic switching means embodied as a power FET 30. The power FET 30 has its gate electrode connected to the output of the drive transistor 22. It is thus switched on and off to provide discrete machining power pulses to the gap. The main DC power supply 32 is shown connected in circuit with the machining gap and the source and drain terminals of the power FET 30. A further current limiting resistor 34 is connected in circuit with the gap to provide a maximum safe limit for gap current.

Also shown in FIG. 1 is the variable control voltage input means which provides a selectively variable DC voltage at point P. In the FIG. 1 embodiment, voltage input is received from an input means used to furnish a binary representation of the output current desired. This may be provided by computer input, microprocessor input, keyboard input, or the like. The four bits are then available as inputs to a digital to analog converter 36. The output from the D/A converter 36 is passed through a voltage amplifier 38 and through a series resistor 40 to provide the control voltage at point P. Thus the voltage level at point P represents the control voltage presented to the gate electrode of the power FET 30 and accordingly controls the current output from the power module to the gap.

In the operation of the circuit the pulse output from the multivibrator 20 turns transistor 22 on and off. The power module is operated through the power FET 30. After each turn-off of the power FET 30, the gate of the power FET 30 is returned to the voltage level preset at point P. As shown by the FIG. 2 diagram, the higher the input or control voltage at point P, the lower the effective resistance and accordingly, the higher the current output from the power module 24. This relationship is a relatively linear one as shown by the graph.

FIG. 3 shows a different form of our invention in which the control voltage at point P is derived from several different EDM operating parameters. The circuit of FIG. 3 includes inputs at terminals S and T representing arc voltage and arc current, respectively. The signal at terminals T may be derived from an ammeter shunt resistor 52 in the EDM gap circuit. With respect to FIG. 3, it will be seen that the voltage output from the next following amplifier 50 represents the magnitude of the current flow in the shunt resistor 52. The arc voltage signal and the arc current signal are then passed as inputs to an analog multiplier 54 so that the voltage output resulting from it is representative of the power being expended in the gap. This voltage then passes through a voltage amplifier 38 and then through the series resistor 40 to point P which is representative of the contorl voltage applied to the gate electrode of the power FET in the following power module 24. Thus the higher the voltage preset at point P on the gate of the FET the lower the resistance of the power module and the more current is available from it. The series resistor 34 is included in the circuit to limit the current through the module to a maximum safe level.

Once again the drive transistor 22 is triggered on and off to turn the power module on and off. When the power module is turned on, it will return to the control voltage set at point P.

FIG. 4 illustrates a straightforward voltage control system in which a potentiometer 56 is used to provide the selectively variable voltage to control the current output of the power module 24. Again, current control is achieved by controlling the voltage on the gate of the power FET 30 in the power module 24 as best shown in FIG. 1.

It will be noted that the control voltage applied can be applied from several different input means including the potentiometer 56 as shown in FIG. 4, the power circuit as shown in FIG. 3, or through a digital input means including I/O port 35. It is possible to preset or change a binary representation of the output current desired by writing it in from a microprocessor or providing an input from a keyboard or the like. With the four-bit capability shown or I/O port 35, there would be sixteen possible current limit positions, but this could be readily expandable with additional bits. It will thus be seen that we have provided by our invention a greatly improved EDM power supply circuit, particularly with respect to the power module and incorporation in it of a power FET in the configuration shown. The selectively variable voltage applied to the gate electrode of the power FET makes it possible to control the current output from the power module in a straightforward and linear manner.

We claim:

1. In an apparatus for machining a conductive workpiece by means of electrical discharge across an EDM gap between a tool electrode and the workpiece; a pulser for providing triggering on-off pulses; a power module including a source of machining power and a power FET having a pair of power conducting electrodes, said power conducting electrodes connected in circuit with said source and said gap; said power FET further having its gate electrode connected to a point for receiving the triggering output of said pulser; and a variable control voltage source further connected to said point for controlling the current output from said module, said control voltage source comprising a variable voltage input representative of gap power and derived from a first signal representing gap voltage and a second signal representing gap current.

2. The combination as set forth in claim 1, wherein said pulser comprises a multivibrator for providing said triggering pulses to the gate of said power FET.

3. The combination as set forth in claim 1, wherein said power FET and source of machining power are connected in series with a current limiting resistor and the gap.

4. The combination as set forth in claim 1, wherein an analog multiplier stage is used to multiply said first and second signals to provide such voltage output representative of gap power.

5. In an apparatus for machining a conductive workpiece by means of electrical discharges across an EDM gap between a tool electrode and a workpiece, a multivibrator for providing triggering on-off pulses; a power module including a source of machining power and a power FET having a gate electrode and a pair of principal electrodes, said principal electrodes connected in series with said source and said gap, said power FET further having its gate electrode operatively connected to the triggering on-off pulses of said multivibrator; and a variable control voltage source likewise operatively connected to said gate electrode for varying the voltage amplitude of the triggering pulses passed to the gate electrode of said power FET and thus the magnitude of the current output from said module, said variable control voltage source including a control voltage derived from and representative of gap power.

6. The combination as set forth in claim 5, wherein a current limiting resistor is connected in series with the gap and the principal electrodes of said power FET.

7. In an apparatus for machining a conductive workpiece by means of electrical discharges across an EDM gap between a tool electrode and the workpiece, a pulser for providing triggering on-off pulses; a power module including a source of machining power and a power FET having a gate electrode and a pair of principal electrodes, said principal electrodes operably connected with said source and said gap to provide machining pulses thereto; said power FET further having its gate electrode connected to the output of said pulser; and a means for providing a selectively variable control voltage to said gate electrode of said power FET for varying the current magnitude of the machining power pulses provided to said gap in a linear manner with said control voltage, in which signals representative of gap voltage and gap voltage are multiplied in an analog multiplier to provide said selectively variable control voltage.

* * * * *